UNITED STATES PATENT OFFICE.

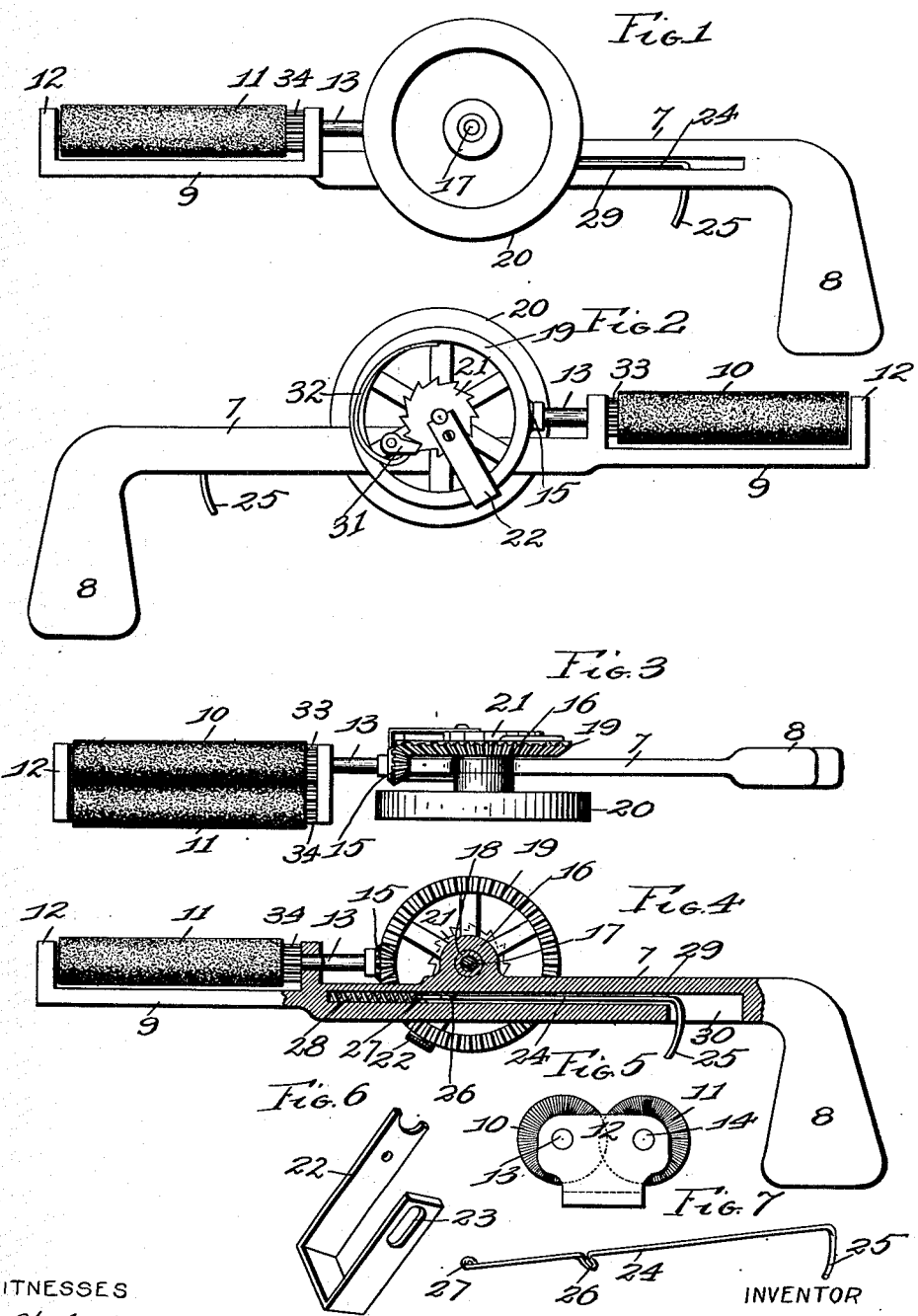

NATHAN LEVIN, OF ST. LOUIS, MISSOURI.

REVOLVING TOOTH-BRUSH.

No. 860,394.        Specification of Letters Patent.        Patented July 16, 1907.

Application filed February 19, 1907. Serial No. 358,308.

*To all whom it may concern:*

Be it known that I, NATHAN LEVIN, a citizen of the United States, and a resident of St. Louis, Missouri, have invented certain new and useful Improvements in Revolving Tooth-Brushes, of which the following is a specification.

This invention relates to improvements in revolving tooth brushes, and consists in the novel arrangement, construction and combination of parts as will be fully hereinafter described and claimed.

The object of my invention is to construct a tooth brush whereby the teeth may be cleaned by revolving brushes.

A further object of my invention is to construct a tooth brush with a pair of brushes revolving in opposite direction to clean the teeth without contacting with and irritating the gums.

In the drawings: Figure 1 is a view of one side of my complete invention. Fig. 2 is a view of the opposite side of the same. Fig. 3 is a top plan view of the same. Fig. 4 is a side elevation with a part thereof in section showing the operating mechanism whereby the brushes are revolved. Fig. 5 is an end view of the same. Fig. 6 is a detail perspective view of the operating lever made use of in carrying out my invention.

Referring to the drawings in detail I construct my invention by providing a supporting frame 7, its one end provided with a handle 8. To the opposite end of the frame I provide a bracket 9 by which are supported revolving brushes 10 and 11. The bracket 9 is constructed with vertical bearings 12 in which are mounted the shafts 13 and 14, the shaft 13 extending through the inner bearing and is provided with a beveled pinion 15. The frame 7 is provided with a boss or vertical projection 16 which acts as a bearing for a shaft 17 and a sleeve 18. Upon the sleeve 18 is mounted a beveled gear wheel 19 and a fly wheel 20, one of said wheels located on each side of the frame. Upon the shaft and to one side of the beveled gear wheel 19 is provided a ratchet wheel 21 to which is connected one end of the operating lever 22, and said operating lever 22 extends downwardly and is bent around the gear wheel, its other end bent upwardly and around the frame and located between said frame and the fly wheel. In the end of the operating lever is provided a slot 23 to which is connected the operating rod 24 whereby reciprocatory movement is imparted to the operating lever 22 by means of the trigger 25 formed on the one end of the operating rod 24. The said operating rod is provided with a loop 26 which extends into the slot 23 of the operating lever, and to the end of the rod 24 is formed an eye 27 to which is attached a retractable coil spring 28, the opposite end of said spring being retained in position within the frame.

In the side of the frame 7 is provided an elongated slot 29 in which the spring and operating rod are embedded, and communicating with said slot and formed in the lower surface of the frame is a short slot 30 through which the trigger 25 extends.

On the beveled gear wheel 19 I provide a pawl 31 the tooth of which is held in contact with the teeth of the ratchet wheel 21 by a spring 32, and while motion is imparted to the ratchet mechanism by pulling upon the trigger 25 the brushes 10 and 11 are revolved in opposite direction by means of the gear wheels 33 and 34 so arranged as to mesh together, the gear wheel 33 being located upon the shaft 13 and operated by means of the meshing gear pinion 15 and the gear wheel 19.

In constructing my invention I make the device of convenient size so that the same may be placed in the vest pocket, and the arrangement of the revolving brushes 10 and 11 is such as to permit the same to be inserted in the mouth bringing said brushes on each side of the teeth so that while the same is being revolved the bristles of the brush will cleanse the teeth on both sides, also the crevices between the adjoining teeth, at the same time preventing the brushes from coming in contact with the gums and irritating the same.

Having fully described my invention, what I claim is:

1. A tooth brush of the class described comprising a frame having a downwardly projecting handle, a slot formed in said frame, a shaft supported by the frame, a pair of revolving brushes carried by the frame, a beveled gear supported upon the frame and a beveled pinion carried by the shaft, an operating rod located in the slot formed in the frame, a trigger formed on the operating rod, a ratchet mechanism whereby motion is imparted to the revolving brushes by manipulation of the trigger, substantially as specified.

2. A device of the class described comprising a frame, a shaft, a brush carried by the shaft and mounted upon the frame, a second brush carried by the frame and located in alinement with the brush upon the shaft, a ratchet mechanism, a rod for operating the ratchet mechanism by a trigger action, a revolving mechanism operated by the ratchet whereby motion is imparted to the brushes, substantially as specified.

3. A device of the class described comprising a frame provided with an elongated slot, an operating rod located in said slot, a pair of revolving brushes mounted upon the frame, a gear wheel and a fly wheel mounted upon the frame, a ratchet mechanism for revolving the gear wheel and fly wheel, a beveled pinion meshing with the gear wheel and connected to the brushes for imparting motion to the same, a trigger formed on the operating rod for imparting motion to the ratchet mechanism, substantially as specified.

4. A device of the class described comprising a frame, a handle formed integral with said frame, a pair of ears formed integral with said frame, a pair of revolving brushes supported in the ears, a shaft connected to one of said brushes for operating the same, a pair of meshing gears carried by the brushes for operating the same in opposite direction, an elongated slot formed in the frame, an operating rod located in the slot, a revolving mechanism supported on the frame, and communicating with the shaft for revolving the brushes, a ratchet mechanism communicating with the revolving mechanism and connected to the operating rod whereby motion is imparted to the brushes by the manipulation of the operating rod, substantially as specified.

In testimony whereof, I have signed my name to this specification, in presence of two subscribing witnesses.

NATHAN LEVIN.

Witnesses:
ALFRED A. EICKS,
WALTER C. STEIN.